No. 756,655. PATENTED APR. 5, 1904.
A. F. KLAMPE.
CORN HUSKING MACHINE.
APPLICATION FILED JUNE 17, 1903.
NO MODEL. 3 SHEETS—SHEET 1.
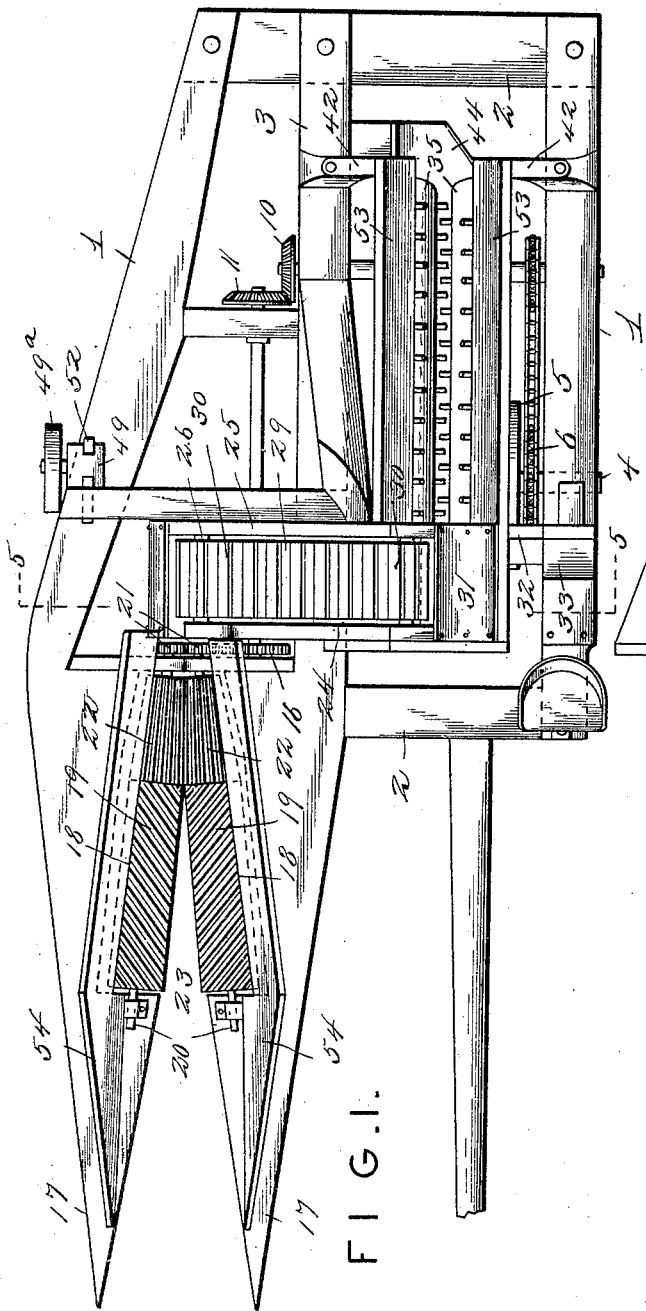
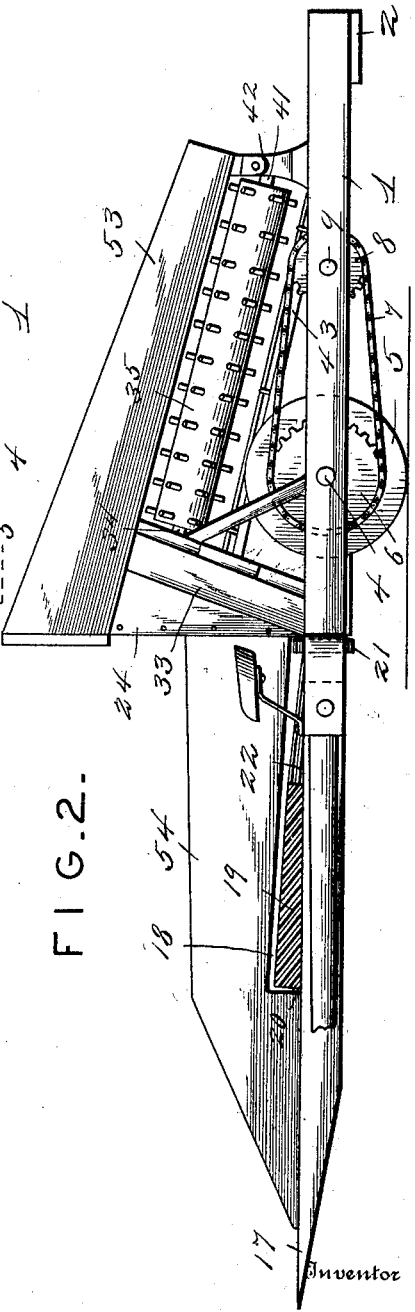

No. 756,655. PATENTED APR. 5, 1904.
A. F. KLAMPE.
CORN HUSKING MACHINE.
APPLICATION FILED JUNE 17, 1903.
NO MODEL. 3 SHEETS—SHEET 2.

Witnesses
Harry L. Amey
Herbert D. Lawson

Inventor
Albert F. Klampe.
By Victor J. Evans.
Attorney

No. 756,655. PATENTED APR. 5, 1904.
A. F. KLAMPE.
CORN HUSKING MACHINE.
APPLICATION FILED JUNE 17, 1903.
NO MODEL. 3 SHEETS—SHEET 3.

Witnesses
Harry L. Amer
Herbert D. Lawson

Inventor
Albert F. Klampe
By Victor J. Evans
Attorney

No. 756,655. Patented April 5, 1904.

UNITED STATES PATENT OFFICE.

ALBERT F. KLAMPE, OF ALLENDORF, IOWA.

CORN-HUSKING MACHINE.

SPECIFICATION forming part of Letters Patent No. 756,655, dated April 5, 1904.

Application filed June 17, 1903. Serial No. 161,914. (No model.)

*To all whom it may concern:*

Be it known that I, ALBERT F. KLAMPE, a citizen of the United States, residing at Allendorf, in the county of Osceola and State of Iowa, have invented new and useful Improvements in Corn-Husking Machines, of which the following is a specification.

My invention relates to new and useful improvements in corn-husking machines; and its object is to provide a machine of this character which may be drawn over a field of corn and which will automatically strip the ears from the stalks and convey them to husking-rolls, from which they may be discharged into a suitable receptacle, such as a wagon or other vehicle, in rear of the machine.

A further object is to provide means for adjusting the machine from or toward the ground, so as to accommodate it to stalks of different heights.

With the above and other objects in view the invention consists in the novel construction and combination of parts hereinafter more fully described and claimed, and illustrated in the accompanying drawings, showing the preferred form of my invention, and in which—

Figure 3:
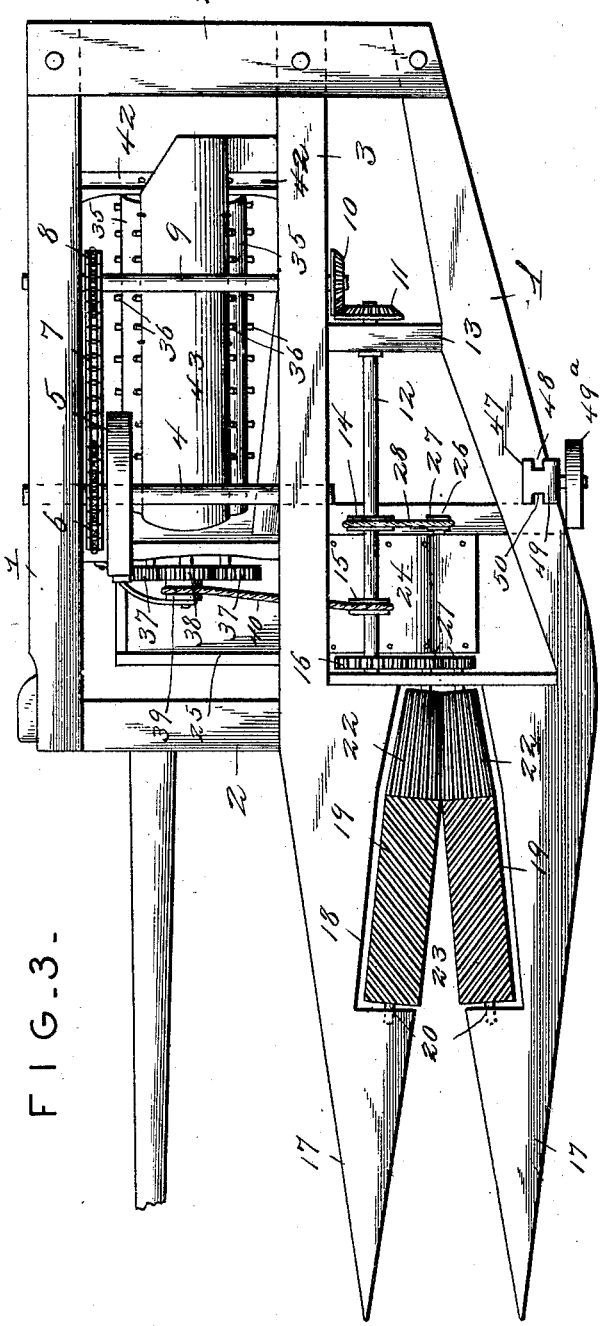
Figure 4:
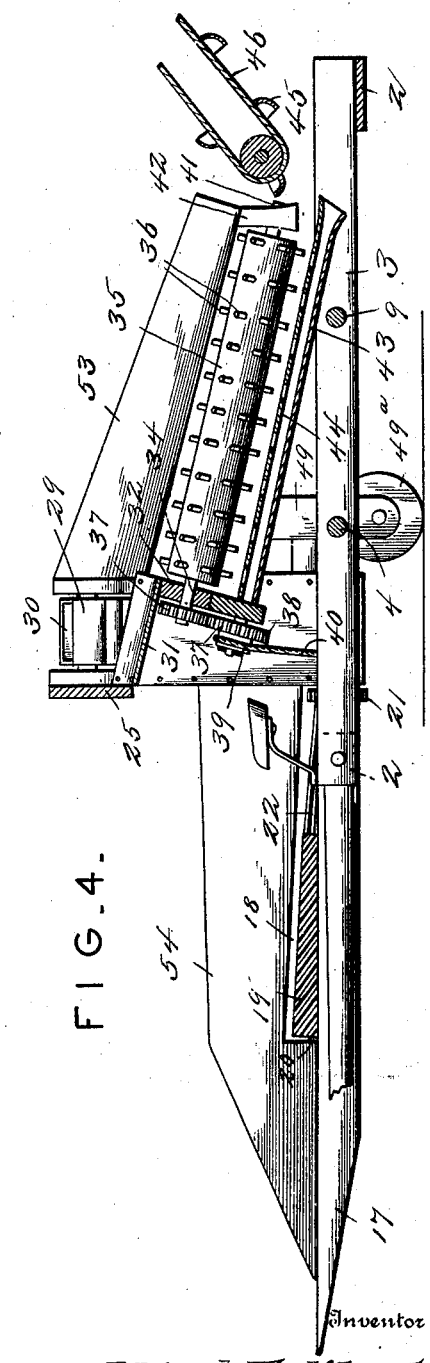
Figure 5:
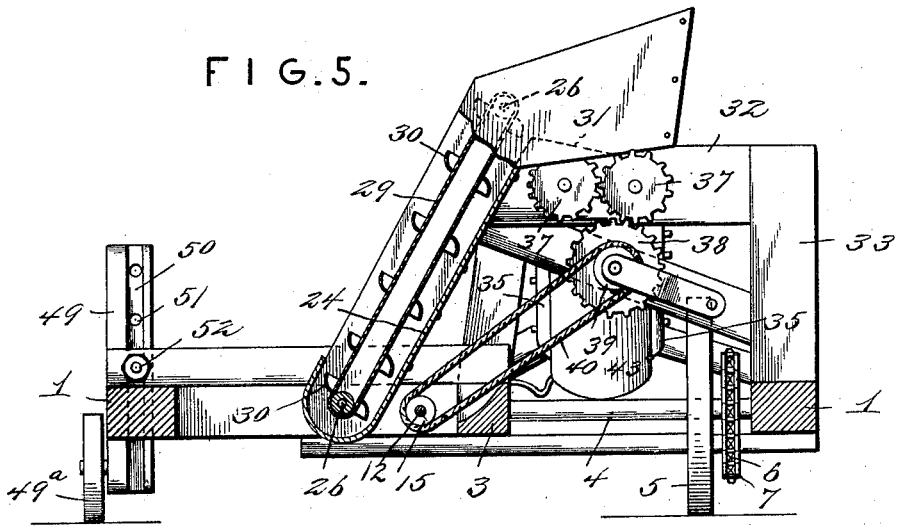
Figure 6:
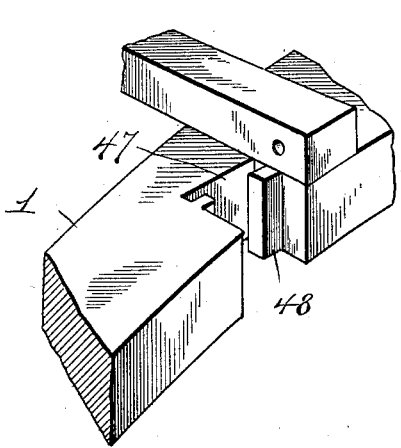
Figure 7:
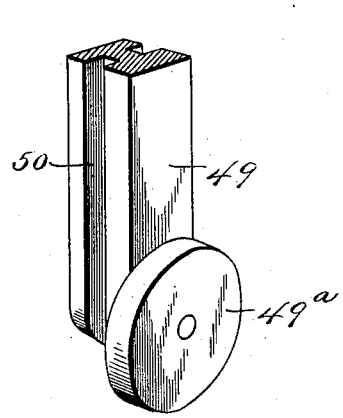

Figure 1 is a plan view of my improved corn-husking machine. Fig. 2 is a side elevation thereof. Fig. 3 is a bottom plan view of the machine. Fig. 4 is a central longitudinal section therethrough. Fig. 5 is a section on line 5 5, Fig. 1. Fig. 6 is a detail view of a portion of one of the side bars of the frame and showing the slot for the reception of the adjustable standard, and Fig. 7 is a perspective view of the adjustable standard and the roll thereon.

Referring to the figures by numerals of reference, 1 1 are the side bars of the frame of the machine, and a longitudinally-extending beam 3 is arranged intermediate the end bars 2 and, together with one of the bars 1, forms a bearing for a shaft 4, upon which is secured a traction-wheel 5, having a sprocket 6 revoluble therewith. This sprocket imparts rotary motion through a chain 7 to a sprocket 8, arranged on a shaft 9, which is also journaled in the beam 3 and the side 1 and is provided with a beveled gear 10, which meshes with a second similar gear 11. This gear is secured at one end of a shaft 12, which is journaled in the front end of the frame and in a transversely-extending strip 13, and pulleys 14 and 15 and a gear 16 are secured to and rotate with this shaft. Gathering-prongs 17 extend forward from the front cross-bar 2, and the inner face of each of these prongs is recessed, as shown at 18, for the reception of a roll 19, one of the necks 20 of which is journaled in the end of the recess 18, while the other neck extends through the front cross-bar of the frame and is provided with a gear 21. The two gears 21 of these rolls mesh, and one of the gears also meshes with the gear 16, so that when shaft 12 is rotated rotary motion will be imparted therefrom to the two rolls. As shown, the rolls are inclined inwardly toward each other and their inner ends are tapered, as shown at 22, and corrugated, and from these tapered portions to the outer ends of the rolls extends a V-shaped pass 23, which is substantially a continuation of the passage formed between the prongs 17.

Arranged in rear of the stripping-rolls 19 is an inclined board 24, having sides 25, within the upper and lower ends of which are journaled shafts 26. The lower shaft is provided with a pulley 27, upon which is arranged a belt 28, which extends over the pulley 14, hereinbefore referred to. An endless belt 29 is arranged on the shafts 26 and is provided with a series of conveyer-buckets 30. The lower end of one of the sides 25 is cut away directly in rear of the rolls 19, so as to permit the corn to move downward upon the inclined rolls 19 into the path of the buckets 30. These buckets are adapted to convey the corn upward and drop it upon an inclined board 31, which is supported by a cross-strip 32, secured to a standard 33. Within this cross-strip are journaled the necks 34 of parallel inclined rolls 35, each of which is provided with a series of pins 36 projecting therefrom. The necks 34 have gears 37 thereon, which mesh with each other, and one of these gears also meshes with a gear 38, having a pulley 29 revoluble therewith. A belt 40 is arranged on this pulley and extends over the pulley 15, hereinbefore referred to, and it is therefore obvious that when shaft 12 rotates the gears 37 and their rolls 35 will also be revolved. The lower necks 41 of the rolls 35 are journaled in hangers 42, secured to the frame in any suitable manner, and arranged under the rolls 35 is an inclined board 43, having a screen 44 thereover. Any material which may pass through the screen will be discharged from the end of board 43 upon the ground. The screen 44, however, will direct the husks to the ground or to a receptacle provided therefor, and the ears will be directed from the rolls 35 to the buckets 45, arranged upon a belt 46, which may be located in the rear of the frame and can be propelled in any suitable manner. This conveyer may be employed for raising the stripped ears to a wagon or other suitable vehicle attached to the rear of the machine. It will of course be understood that in lieu of the conveyer-belt 46 a large receptacle can be arranged upon the rear of the frame, so as to receive the stripped ears. The side bar 1, which is removable from the traction-wheel 5, is preferably provided with a recess 47, upon the side walls of which are arranged vertically-extending ribs 48. A standard 49, having longitudinally-extending grooves 50 in the sides thereof, is located within the recess 47, and the ribs 48 are adapted to extend into grooves 50. Passages 51 extend through standard 49 and are adapted to receive a pin 52, which may be inserted through a beam upon the frame, and thereby lock the standard in adjusted position. A small traction-wheel 49$^a$ is mounted at the lower end of standard 49. Boards 53 are arranged above and at the side of the pass between the rolls 35, and boards 54 are also arranged longitudinally upon the prong 17.

When the machine is drawn forward, the chain 7 transmits rotary motion from the traction-wheel 5 to the shaft 9, which when turned rotates the longitudinally-extending shaft 12. The rolls 19 are thus caused to rotate in opposite directions and will strip the ears from the stalks and cause them to slide downward toward the rear end of the rolls and into the path of the buckets 30. Belt 29, to which these buckets are secured, is operated by the belt 28, which passes over pulleys 14 and 27, and the buckets carry the ears upward and deposit them upon inclined board 31, from which they slide upon and between the husking-rolls 35. These rolls are rotated through the gears 37 and 38, and motion is transmitted from the shaft 12 to the gears through the belt 40 and pulleys 15 and 39. The pins 36 upon the rolls 35 will tear the husks from the ears and deposit them upon the screen 44, from which they will slide downward to the ground or to a receptacle provided therefor. Any grains of corn which may become detached from the ears during the husking operation will fall through the screen 44 and upon the inclined board 43, by which they will be directed to any suitable receptacle provided therefor. The husked ears will move downward upon the inclined rolls 35 and drop into the buckets 45 of the conveyer-belt 46 or into a receptacle suitably located at the lower end of the rolls. By raising or lowering the standard 49 and securing it by means of the pin 52 the frames of the machine can be adjusted so as to accommodate the same to stalks of different heights.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

1. In a machine of the character described, the combination with a frame having gathering-prongs extending therefrom, and a traction-wheel; of stripping-rolls journaled upon the prongs and forming a V-shaped pass therebetween, tapered inner ends to the rolls having longitudinally-extending corrugations therein, and means for transmitting rotary motion to the rolls from a traction-wheel.

2. In a machine of the character described, the combination with a frame, and gathering-prongs extending from the frame and provided with recesses in their inner faces; of stripping-rolls journaled within the recesses and forming a V-shaped pass therebetween, said rolls having tapered portions contacting with each other and having longitudinally-extending corrugations therein, and means for imparting rotary motion to the rolls from the traction-wheel.

3. In a machine of the character described, the combination with a frame having a traction-wheel, and gathering-prongs extending from the frame and having recesses therein; of stripping-rolls journaled within the recesses and forming a V-shaped pass, said rolls having tapered inner ends provided with longitudinally-extending corrugations, inclined husking-rolls, a conveyer intermediate the inner ends of the stripping and husking rolls, and means for operating the rolls and conveyer from the traction-wheel.

4. The combination with a frame having a traction-wheel, and gathering-prongs extending from the frame and having recesses therein; of stripping-rolls journaled within the recesses and forming a V-shaped pass, the inner ends of said rolls being tapered and provided with longitudinally-extending corrugations, meshing gears revoluble with the rolls, a longitudinally-extending shaft, means for transmitting rotary motion from the traction-wheel to said shaft, a gear on the shaft meshing with one of the gears of the rolls, a conveyer, means for transmitting motion from the shaft to the conveyer, parallel inclined husking-rolls, meshing gears revoluble therewith, and means for transmitting rotary motion from the shaft to said gears.

In testimony whereof I affix my signature in presence of two witnesses.

ALBERT F. KLAMPE.

Witnesses:
HARRY RUSSELL,
LINCOLN A. FLEISHER.